No. 723,968. PATENTED MAR. 31, 1903.
J. H. YOUNG.
MACHINE FOR CUTTING TIMBER AT THE SURFACE OF THE GROUND.
APPLICATION FILED FEB. 28, 1902.
NO MODEL.

Witnesses
E. H. Stewart
J. F. Riley

John H. Young,
Inventor
by C. A. Snow & Co.
Attorneys

UNITED STATES PATENT OFFICE.

JOHN HUSTON YOUNG, OF FILLEY, MISSOURI.

MACHINE FOR CUTTING TIMBER AT THE SURFACE OF THE GROUND.

SPECIFICATION forming part of Letters Patent No. 723,968, dated March 31, 1903.

Application filed February 28, 1902. Serial No. 96,154. (No model.)

*To all whom it may concern:*

Be it known that I, JOHN HUSTON YOUNG, a citizen of the United States, residing at Filley, in the county of Cedar and State of Missouri, have invented a new and useful Machine for Cutting Timber at the Surface of the Ground, of which the following is a specification.

The invention relates to improvements in saws.

The object of the present invention is to improve the construction of saws and to provide a simple, inexpensive, and efficient one designed for cutting down trees at the surface of the ground and capable of being readily operated and of automatically feeding itself laterally, whereby it is advanced to a tree simultaneously with its longitudinal movement.

The invention consists in the construction and novel combination and arrangement of parts hereinafter fully described, illustrated in the accompanying drawings, and pointed out in the claims hereto appended.

Figure 1:
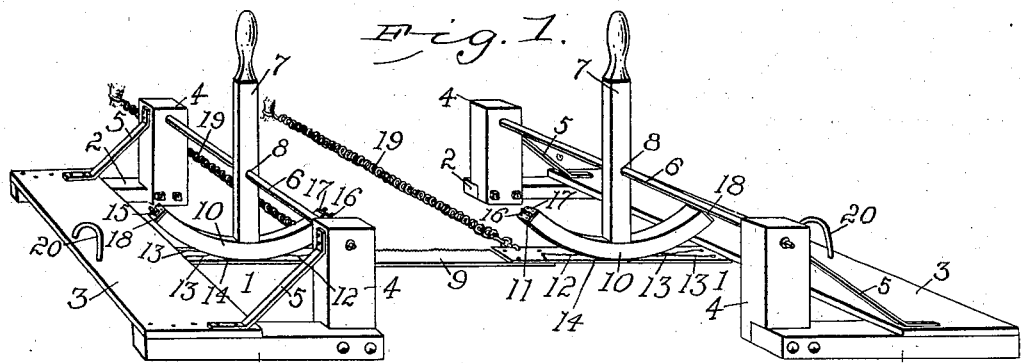
Figure 2:
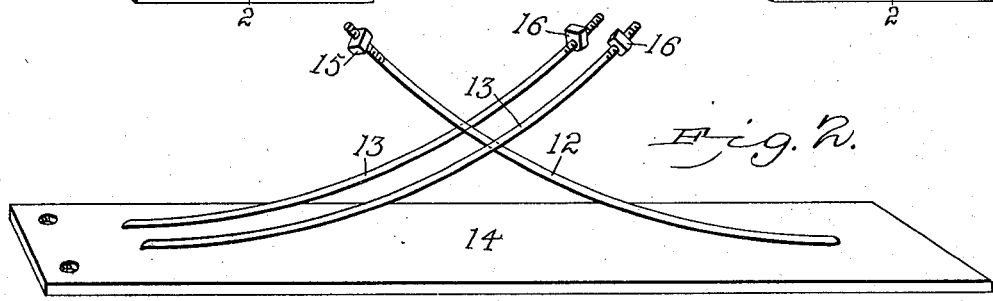
Figure 3:
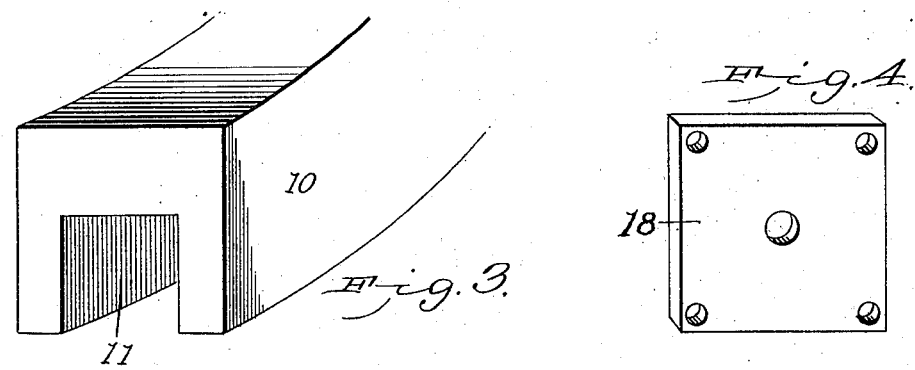
Figure 4:
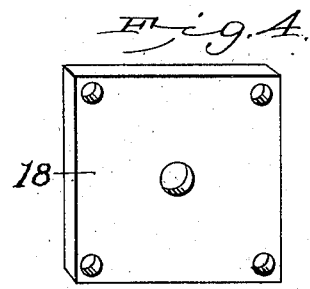
Figure 5:
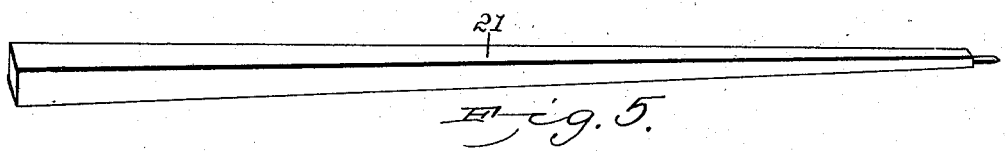

In the drawings, Figure 1 is a perspective view of a saw constructed in accordance with this invention. Fig. 2 is a detail view illustrating the construction for connecting the saw-carrying bars with the operating-levers. Fig. 3 is a detail view of a portion of the head of one of the operating-levers. Fig. 4 is a detail view of one of the plates for connecting the springs to the lever. Fig. 5 is a detail view of the bar for enabling the saw to be carried from one place to another and for causing a tree to fall in the desired direction.

Like numerals of reference designate corresponding parts in all the figures of the drawings.

1 1 designate similar supporting-frames provided with lower side bars or sills 2, supporting a platform 3 and extending inward beyond the same and having standards 4 at their inner ends. The standards 4, which are suitably secured to the sides of the frames, are supported by inclined braces 5, and they are connected at their upper ends by a transverse pivot-rod 6.

Mounted on the pivot-rods are upright operating-levers 7, provided with perforations 8 to receive the said rods and adapted to be moved transversely of the frames, as hereinafter explained, to feed a saw-blade 9 through a tree. Each lever is provided at its lower end with a curved head or portion 10, having a groove 11 in its outer face for the reception of springs 12 and 13 or other flexible connections for securing a horizontal saw-carrying bar or plate 14 to the lever. The spring 12 is centrally arranged in the groove and is secured at the inner end of the saw-carrying plate or bar, and the springs 13, which are located at opposite sides of the central spring, are secured at their lower ends to the outer end of the plate or bar 14. The upper ends of the springs are threaded for the reception of nuts 15 and 16 and are secured by the latter to plates 17 and 18, arranged on the inner and outer ends of the curved portion or head of the operating-lever. Instead of employing the springs any other suitable flexible connection may be employed for connecting the saw-carrying plates or bars with the levers.

The saw-blade, which is suitably secured to the inner ends of the plates or bars 14, is fed automatically by means of transversely-disposed coiled springs 19, connected with the inner ends of the plates or bars 14 and designed to be located at opposite sides of a tree and to be staked beyond the same or otherwise secured under tension whereby the saw is fed through a tree. The levers are adapted to slide freely in the horizontal pivots, which are disposed transversely of the machine. The platforms are provided with loops 20, adapted to receive a bar 21 for enabling the machine to be readily carried from one place to another. The bar is provided at one end with a projection or spur and is adapted to be placed against a tree to cause the same to fall in a desired direction.

The machine is placed against a tree and the transversely-disposed coiled springs are stretched at opposite sides of the same, and the operators stand upon the platforms and oscillate the operating-levers, and thereby reciprocate the saw, which is automatically fed through the tree by the said springs.

What I claim is—

1. A machine of the class described comprising a pair of upright operating-levers, means for supporting the operating-levers and for permitting the same to slide transversely, a saw-blade connected with and carried by the operating-levers, and a tension device for feeding the saw transversely and for causing the levers to slide, substantially as described.

2. A machine of the class described comprising a pair of horizontal pivots, means for supporting the same, a pair of upright operating-levers slidable on the pivots, a saw-blade connected with and carried by the levers, and a tension device for feeding the saw transversely and for causing the levers to slide on the pivots, substantially as described.

3. A machine of the class described comprising frames designed to be arranged at opposite sides of a tree, transversely-slidable operating-levers fulcrumed on the frame, a saw-blade connected with and carried by the levers, and a pair of tension devices arranged adjacent to the ends of the saw and adapted to feed the same transversely, substantially as described.

4. A machine of the class described comprising a pair of frames having platforms, transverse pivots extending across the frames, upright levers slidable on the pivots, a saw-blade connected with and carried by the levers, and a pair of coiled springs arranged adjacent to the ends of the saw-blades for moving the same transversely, substantially as described.

5. A machine of the class described comprising a pair of frames composed of two sides and a connecting-platform and provided with standards, transverse pivots supported by the standards, upright levers slidable on the pivots and having curved heads provided with grooves, a saw-blade provided with plates or bars, resilient connections arranged in the grooves and secured to the plates or bars and to the levers, and means for feeding the saw transversely, substantially as described.

JOHN HUSTON YOUNG.

Witnesses:
M. M. COOPER,
G. A. SMITH.